Aug. 5, 1969 H. R. CAMENZIND 3,459,970

TIMING NETWORK

Filed Feb. 2, 1966 2 Sheets-Sheet 1

INVENTOR
HANS R. CAMENZIND
BY Robert [signature]
ATTORNEY

INVENTOR
HANS R. CAMENZIND
BY
Robert [signature]
ATTORNEY

United States Patent Office 3,459,970
Patented Aug. 5, 1969

3,459,970
TIMING NETWORK

Hans R. Camenzind, Lexington, Mass., assignor to P. R. Mallory & Co. Inc., Indianapolis, Ind., a corporation of Delaware Filed Feb. 2, 1966, Ser. No. 524,544
Int. Cl. H03k 1/14
U.S. Cl. 307—265 6 Claims

ABSTRACT OF THE DISCLOSURE

A circuit means for providing a pulse-width modulated output waveform from an input waveform including, in combination, a single timing network, a differential amplifier, a bi-stable multivibrator and a reset means.

The present invention relates to timing networks and more particularly to the means and methods for deriving two related time periods from the same timing network.

In integrated circuits it is rather difficult to produce components having narrow tolerances. If, as in the case of two-state amplifiers, two time periods have to be made equal or the sum of both time periods has to remain constant, it is of considerable advantage to derive both periods from the same timing network. Hence, the two time periods will be equal or the sum of both time periods will remain constant, even if the timing network is subject to large tolerances.

The use of a single timing network is advantageous because a group of components is used twice, thereby saving costly integrated circuit wafer area. Since timing networks involve a capacitor, which is large in size compared to transistors, diodes, and resistors, the savings in area can amount to a large percentage of the overall integrated circuit size.

Another feature of the circuit of the present invention is that the timing capacitor is charged and discharged with a constant current rather than through a constant resistance. In this way the linearity of the duty-cycle is ideal and the capacitor can be made smaller.

Accordingly, there is presented in this specification a single timing network for deriving the time periods of the first and second output circuits. The timing capacitor of the network is discharged through a transistor and a resistor. The voltage at the base of the transistor is held constant and the discharge of the capacitor is at a constant rate. When the voltage across the capacitor, which is derived from the first output circuit, drops to a predetermined level, a reset switch is triggered and the capacitor is recharged to the momentary level of the second output circuit. When the voltage across the capacitor again drops to a predetermined level, a reset switch is triggered and the capacitor is recharged to the momentary level of the first output circuit.

The illustrative embodiment of the specification involves the use of a single timing network for determining the relative time periods for the double ended output of a differential amplifier. Two momentary reset switches and a flip-flop circuit are used in conjunction with said timing network to provide a pulse-width modulated output waveform which is dependent on the level of the input to the differential amplifier. The illustrative embodiment will be further described in this specification.

It is an object of the present invention, therefore, to provide a means for deriving two related time periods from the same timing network.

It is another object of the present invention to provide a single timing network which will determine the time periods for the output waveform of a two-state amplifier.

It is a further object of the present invention to provide a single timing network for determining the relative time periods of the output of a differential amplifier having a double ended output.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein the scope of the invention is determined rather from the dependent claims.

For illustrative purposes, the invention will be described in conjunction with the accompanying drawings in which.

Generally speaking, the present invention is a circuit for deriving two related time periods from a single timing network, said timing network including a transistor having an emitter, base, and collector electrodes, a capacitor, and a resistor, said capacitor being coupled between ground and said collector electrode, said resistor being coupled between ground and said emitter electrode, and said base electrode being coupled to a constant voltage source, said circuit comprising: first circuit means having first and second outputs; second circuit means having alternate conduction states; reset means for alternately connecting said first and second outputs to said timing circuit, thereby charging said capacitor to the voltage presented by the output connected thereto; third circuit means for connecting said second circuit means to said timing circuit so as to change the state of said second circuit means when said capacitor is discharged to a predetermined level; and fourth circuit means for connecting said second circuit means to said reset means so as to switch said reset means between said first and second outputs of said first circuit means when said second circuit means changes state.

A specific application of the present invention would be a two-state amplifier comprising: a differential amplifier having a single ended input and a double ended output; a bistable multivibrator having alternate conduction states; a timing circuit including a transistor having an emitter, base, and collector electrodes, a capacitor, and a resistor, said capacitor being coupled between ground and said collector electrode, said resistor being coupled between ground and said emitter electrode, and said base electrode being connected to a constant voltage source; reset means for alternately coupling each of said outputs of said differential amplifier to said timing network, thereby charging said capacitor to the voltage presented by the output connected thereto, said reset means being coupled to a common junction between said capacitor and said emitter; first circuit means for connecting said multivibrator to said timing circuit so as to change the state of said multivibrator when said capacitor is discharged to a predetermined level; and second circuit means for connecting said multivibrator to said reset means so as to switch said reset means from one of said differential amplifier outputs to the other when said multivibrator changes state.

Figure 1:
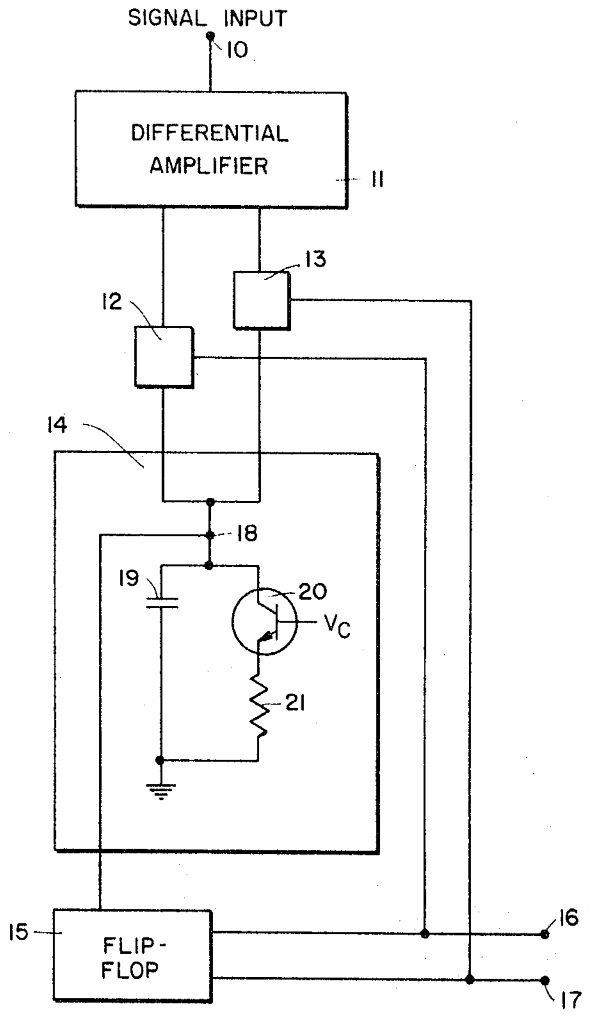
FIGURE 1 is a block diagram showing the timing network of the present invention connected to the two outputs of a differential amplifier and a flip-flop circuit.

Referring now to the drawing, and particularly to the block diagram of FIGURE 1, the circuitry of the present invention can be visualized in conjunction with the following description. The input signal to the differential amplifier 11 is provided at the terminal 10. The differential amplifier 11 has a double ended output which is connected to the momentary reset switches 12 and 13. The momentary reset switches 12 and 13 are connected to the single timing circuit 14 and to the bistable multivibrator circuit, hereinafter referred to as the flip-flop circuit 15. The output of the flip-flop 15 is provided at the terminals 16 and 17.

The flip-flop 15 is connected to the timing circuit at the point 18. The point 18 is connected to a first side of the capacitor 19 and to the collector of the transistor 20. The second side of the capacitor 19 is connected to ground. The base of the transistor 20 is connected directly to a constant voltage source and the emitter of said transistor 20 is connected to the resistor 21 and through said resistor to ground.

With the above description of circuitry in mind, and by making reference to the drawing figures, the following analysis of operation will serve to convey the functional details of the present invention. Assume that the capacitor 19 is being discharged through the transistor 20 and the resistor 21. The voltage at the base of the transistor 20 is held constant and the discharge of the capacitor 19 is at a constant rate. As the voltage across the capacitor 19 drops to a predetermined lower level, the flip-flop circuit 15 is triggered and the outputs of said flip-flop circuit changes states (i.e. one output moves up and the other output moves down). The one output that moves up triggers a momentary reset switch 12 or 13, thereby recharging the capacitor to the momentary level of the output of the differential amplifier 11 which is connected to said momentary reset switch. If this output level is high, it will take the capacitor 19 a relatively long time to discharge to the predetermined lower level. If this output level is low, the capacitor 19 will be discharged in a relatively short time.

Since the flip-flop circuit 15 changes state each time the predetermined lower level is reached, the capacitor 19 is charged alternately to one of the two output levels of the differential amplifier 11. Since the outputs of the differential amplifier 11 are of opposite phase, pulse-width modulation takes place. The output signal provided at the terminals 16 and 17 is of high quality and stability. The repetition rate is constant and when there is no input to the differential amplifier 11, the duty-cycle will be exactly 50%.

Figure 2:
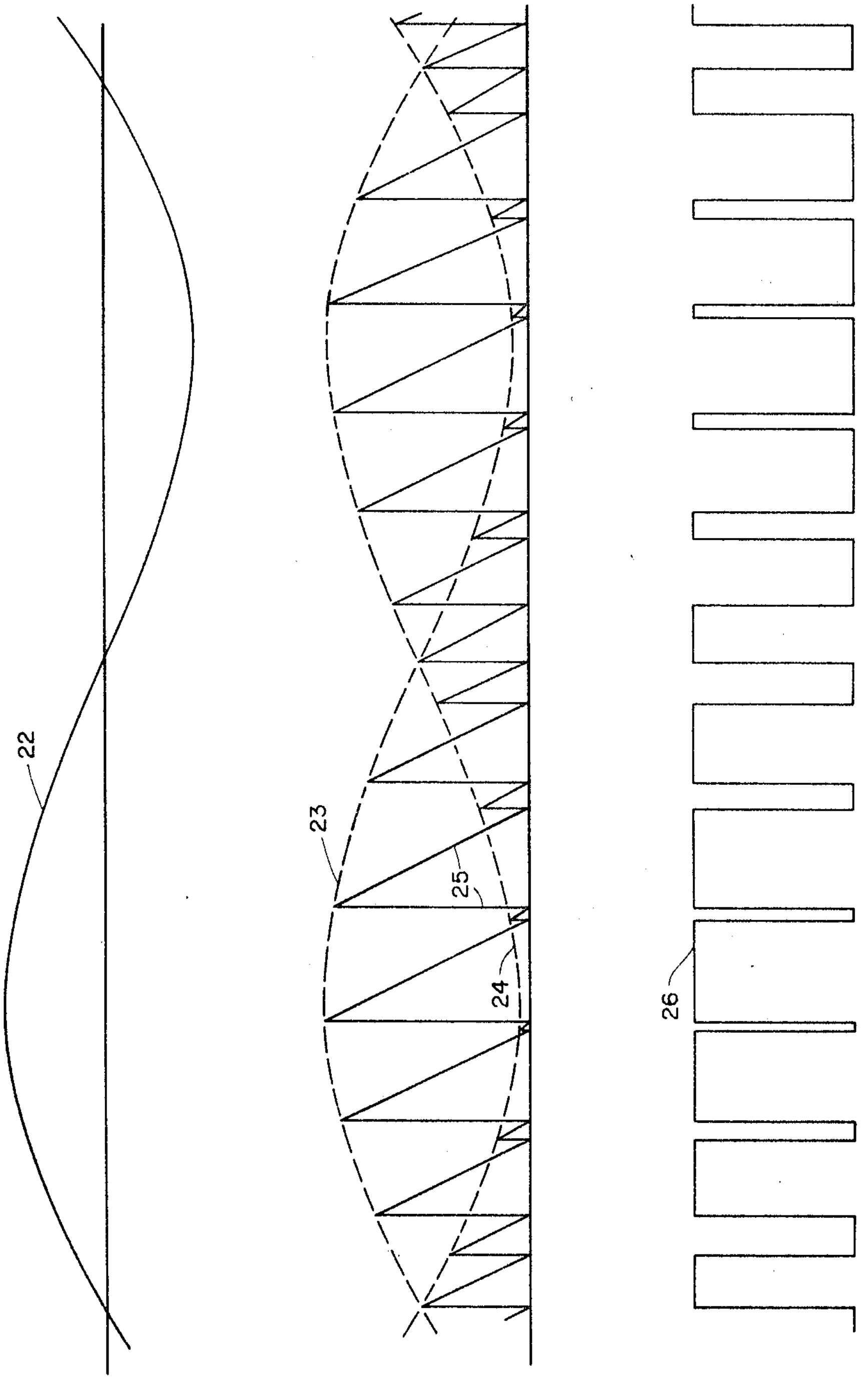
FIGURE 2 is a diagram showing the input waveform to the differential amplifier, the voltage at the timing capacitor, and the resulting pulse-width modulated output waveform of the combination of circuitry.

Referring now to FIGURE 2, a diagram showing the input waveform to the differential amplifier 11, the output waveform of the differential amplifier 11, the waveform at the point 18, and the pulse-width modulated output of the flip-flop circuit can be discussed. The curve 22 represents the waveform of the input signal to the differential amplifier 11. The dotted line curves 23 and 24 represent the waveforms of the two outputs of the differential amplifier 11. The triangular waveform represents the waveform at the point 18. The pulse-width modulated output waveform 26 represents the output provided at the terminals 16 and 17. The waveforms 22, 23, 24, 25 and 26 are drawn on the same time base to show how the input to the differential amplifier 11 results in the output at the terminals 16 and 17.

The circuitry of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A circuit for deriving a pulse-width modulated output waveform from an input waveform comprising a timing network including a transistor having an emitter, base, and collector electrodes, a capacitor, and a resistor, said capacitor being coupled between ground and said collector electrode, said resistor being coupled between ground and said emitter electrode, and said base electrode being coupled to a constant voltage source; a first circuit means for deriving a first and second outputs from an input; a second circuit means having alternate conduction states; reset means for alternately connecting said first and second outputs to said timing network, thereby charging said capacitor to the voltage presented by the output connected thereto; a third circuit means for connecting said second circuit means to said timing network so as to change the state of said second circuit means when said capacitor is discharged to a predetermined level; a fourth circuit means for connecting said second circuit means to said reset means so as to switch said reset means between said first and second outputs of said first circuit means when said second circuit means changes state; and an output means connected to said fourth circuit means from which said pulse-width modulated output waveform is provided.

2. A circuit as in claim 1 wherein said reset means is a first and second reset switch means, said first reset switch means being coupled to said first output of said first circuit means and said second reset switch means being coupled to said second output of said first circuit means.

3. A circuit as in claim 1 wherein said first circuit means is a differential amplifier having a single ended input and a double ended output.

4. A circuit as in claim 1 wherein said second circuit means is a bistable multivibrator.

5. A two-state amplifier comprising: a differential amplifier having a single ended input and a double ended output; a bistable multivibrator having alternate conduction states; a timing circuit including a transistor having an emitter, base and collector electrodes, a capacitor, and a resistor, said capacitor being coupled between ground and said collector electrode, said resistor being coupled between ground and said emitter electrode, and said base electrode being connected to a constant voltage source; reset means for alternately coupling each of said outputs of said differential amplifier to said timing network, thereby charging said capacitor to the voltage presented by the output connected thereto, said reset means being coupled to a common junction between said capacitor and said emitter; first circuit means for connecting said multivibrator to said timing circuit so as to change the state of said multivibrator when said capacitor is discharged to a predetermined level; and second circuit means for connecting said multivibrator to said reset means so as to switch said reset means from one of said differential amplifier outputs to the other when said multivibrator changes state.

6. A two-state amplifier as in claim 5 wherein said reset means is a first and second switching means, said first switching means being coupled to a first of said differential amplifier outputs and said second switching means being coupled to a second of said differential amplifier outputs.

References Cited

UNITED STATES PATENTS

| | | | |
|---|---|---|---|
| 2,874,284 | 1959 | Conger | 328—127 |
| 3,040,273 | 1962 | Boff | 328—127 |
| 3,168,658 | 2/1965 | Marshall | 307—235 |
| 3,169,233 | 2/1965 | Schwartz | 307—235 |
| 3,256,426 | 6/1966 | Roth et al. | 328—127 |
| 3,388,266 | 6/1968 | Kjar | 307—294 |

ARTHUR GAUSS, Primary Examiner

H. A. DIXON, Assistant Examiner

U.S. Cl. X.R.

328—58; 332—9